July 24, 1956 — G. LJUNGSTRÖM — 2,755,700
ANTIGLARE SYSTEM FOR VEHICLES
Filed Nov. 14, 1951 — 7 Sheets-Sheet 1
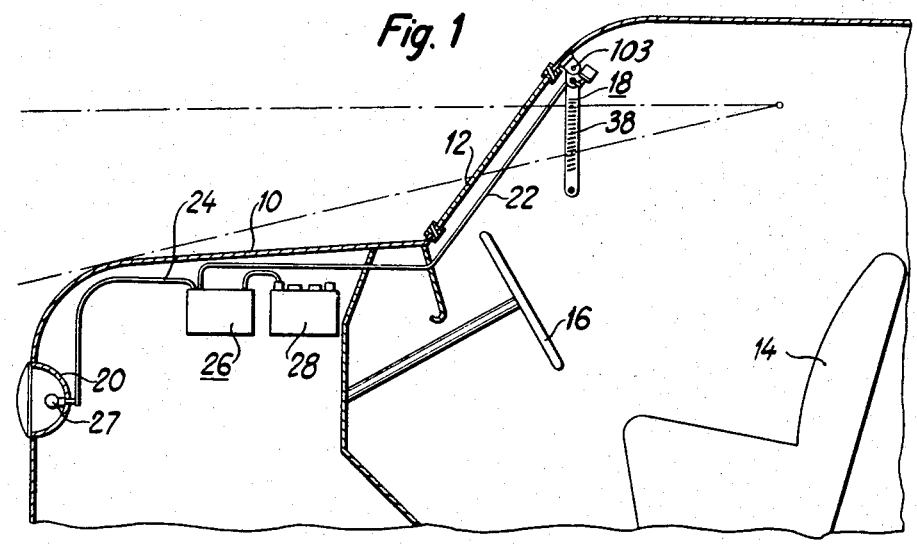
Fig. 1
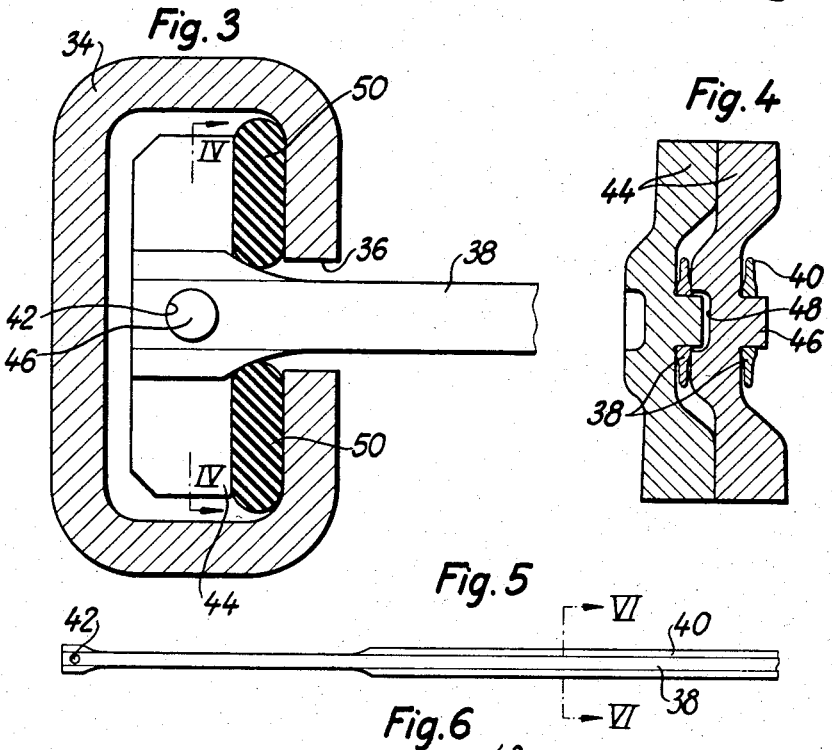
Fig. 3
Fig. 4
Fig. 5
Fig. 6
Inventor
Gunnar Ljungström
By his Attorney

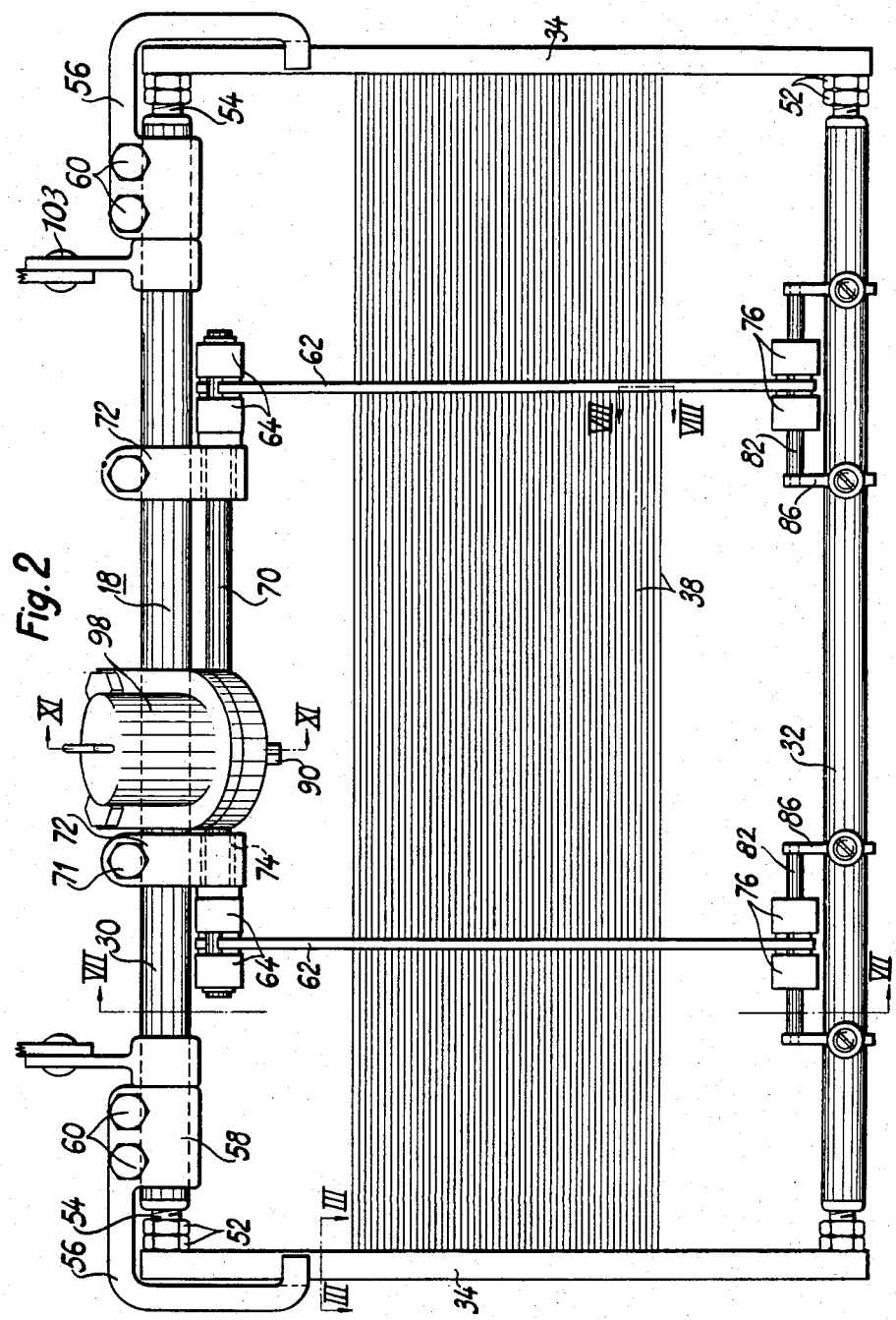

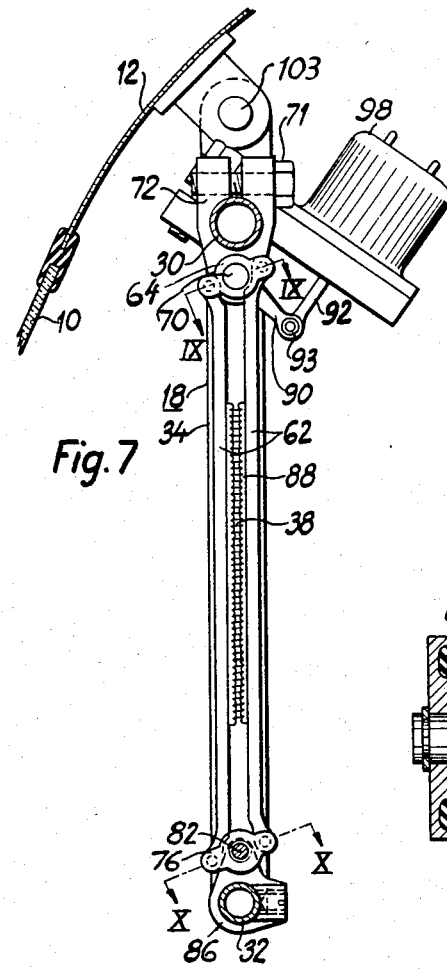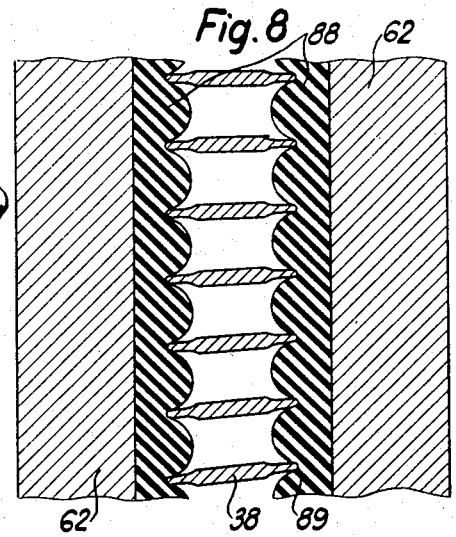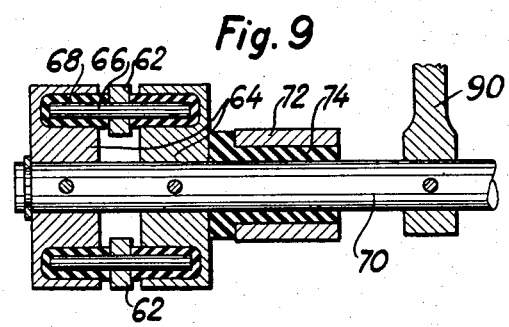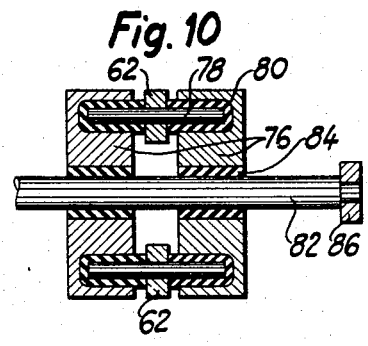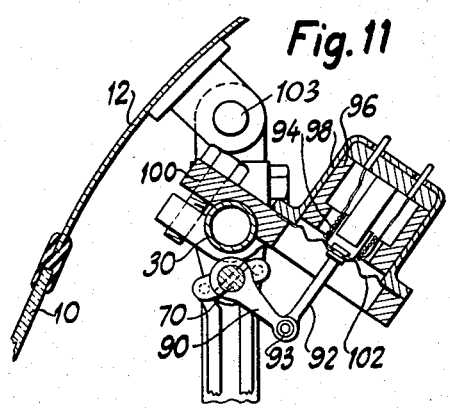

July 24, 1956  G. LJUNGSTRÖM  2,755,700
ANTIGLARE SYSTEM FOR VEHICLES
Filed Nov. 14, 1951  7 Sheets-Sheet 7
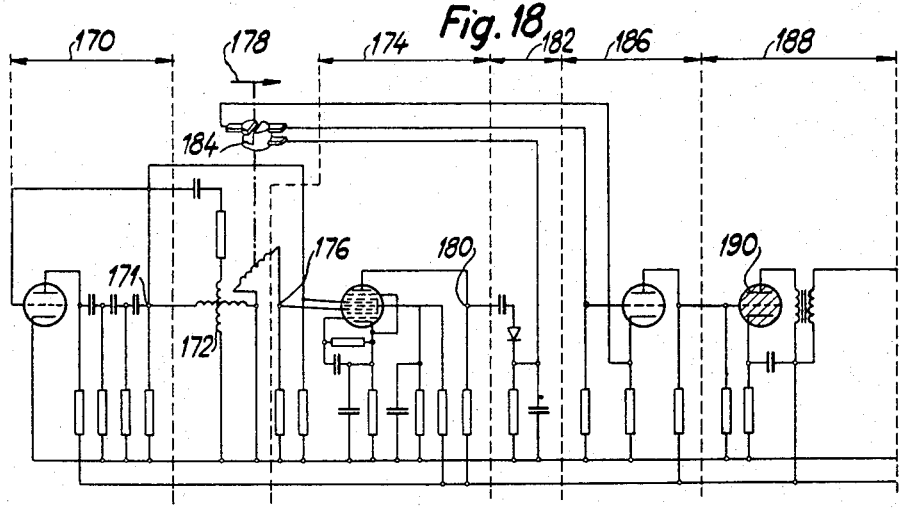
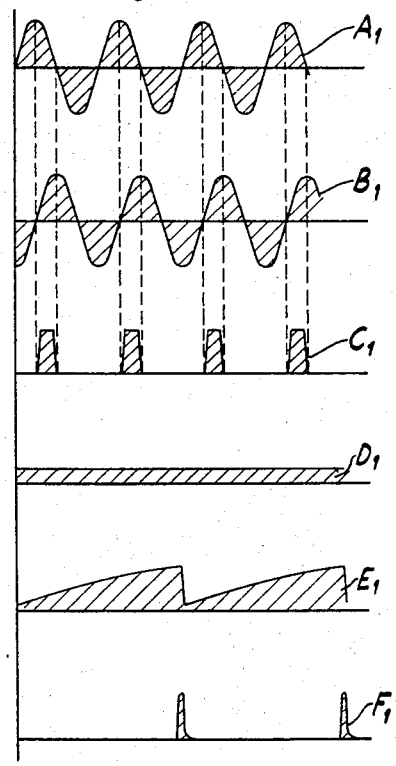
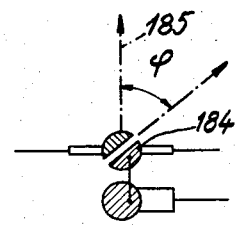
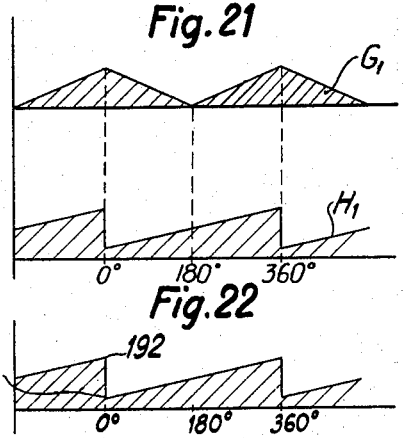
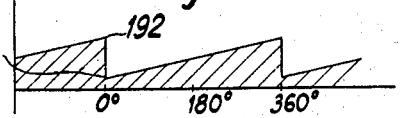

United States Patent Office 2,755,700
Patented July 24, 1956

2,755,700

ANTIGLARE SYSTEM FOR VEHICLES

Gunnar Ljungström, Trollhättan, Sweden

Application November 14, 1951, Serial No. 256,349

Claims priority, application Sweden November 16, 1950

3 Claims. (Cl. 88—1)

My invention relates to systems provided in vehicles for counteracting and/or preventing glare from the lighting installation of an approaching vehicle. The invention relates more particularly to such systems of the kind comprising members for the intermittent emission of light from the lighting installation of the vehicle and members for the intermittent screening of the driver's field of view, wherein the screening members leave the field of view open simultaneously with the emission of light from the vehicle's lighting installation.

In such devices there is arranged in front of the driver a movable screen adapted alternately to obstruct and to open the driver's field of view so as alternately to obscure and uncover his view of the road, the intermittent admission of light to the driver's eye coinciding with the emission of light from the headlamp. It has also been proposed in such devices to operate the same so that the dark periods, that is to say the period during which the driver has no view of the roadway and when the headlight is inoperative, are of longer duration than the light periods. To compensate for the reduction of the quantity of light thus reaching the driver's eye the luminous intensity of the head-light is increased correspondingly.

One object of my invention is to provide an improved anti-glare system of this kind which is adapted to relieve the driver of a vehicle equipped with the system of the inconvenience of the head-light glare of an approaching vehicle, whether the latter is equipped with the same system or not.

Another object of my invention is to provide means permitting correlation of the anti-glare systems of two vehicles, so that when they approach one another both drivers have a view of the roadway sufficiently illuminated without being detrimentally affected by the head-light glare of the approaching vehicle.

A further object of my invention is to form said means so as to function automatically in depedence on the driving direction of the vehicles and so that the screening and the emission of light are effected at so high a frequency as to ensure a continuous and sufficiently clear view of the roadway.

Further objects and advantages of the invention will be apparent from the following description considered in connection with the accompanying drawings, which form a part of this specification, and of which:

Fig. 1 is a diagrammatic representation of a section through a motor car provided with a dimming system in accordance with the invention.

Fig. 2 shows in elevation a screen placed in front of the eye of the driver.

Fig. 3 is a horizontal section on a larger scale along the line III—III of Fig. 2.

Fig. 4 is a section on line IV—IV of Fig. 3.

Fig. 5 shows a portion of a band comprised in the screen and viewed from above, and Fig. 6 shows the same band in section on line VI—VI of Fig. 5, on a larger scale.

Fig. 7 is a vertical section through the screen on line VII—VII of Fig. 2.

Fig. 8 is a section on a larger scale on the line VIII—VIII of Fig. 2.

Figs. 9 and 10 show sections on a larger scale on lines IX—IX and X—X of Fig. 7, respectively.

Fig. 11 is a section on the line XI—XI of Fig. 2 through an electrodynamic driving means actuating the movable parts of the screen.

Fig. 18 shows an alternative embodiment of that part of the electrical apparatus adapted to determine the frequency.

Fig. 19 is a diagram of the voltage curves obtained as a function of the time at various points of the last-mentioned embodiment.

Fig. 20 is a diagrammatic representation of a current reverser pertaining to the same embodiment.

Figs. 21 and 22 illustrate diagrams of the variations of the voltages and the frequency dependent on the direction of driving of the vehicle.

Figure 12:
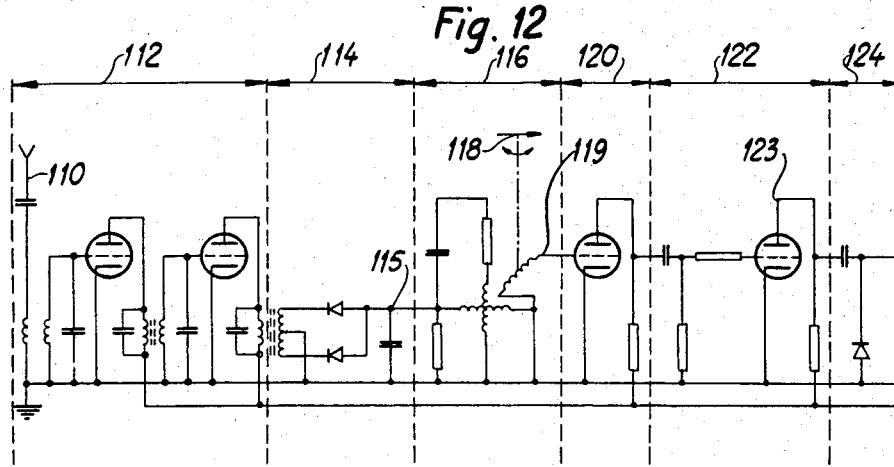
Fig. 12 shows a diagram of connections for a part of the electrical apparatus according to one embodiment of the invention comprising a radio receiver and a goniometer to provide for frequency control and phase control in the dimming system.

The motor car shown in Fig. 1 comprises a car body 10 provided with a wind shield 12, a driver's seat 14 and a steering wheel 16 in known manner. Arranged in the field of vision of the driver through the wind shield 12 is a screen devised in accordance with the invention and designated generally by 18. The screen 18 and one or more head-lights 20 are connected by means of wires 22 and 24 respectively to a unit denoted generally by 26, wherein electrical impulses are generated for the operation of the screen and the head-light. The source of illumination 27 of the head-light preferably consists of a gaseous discharge tube of the high pressure type. The unit is fed with current from an electric storage battery 28, which in turn is charged by a dynamo driven by the car engine in known manner.

The screen 18 has a rectangular frame composed of two horizontal tubular elements 30, 32 and two elements 34 at right angles to said tubular elements. The frame elements 34 are of a C-profile in section with the free longitudinally extending edges bent towards one another so as to leave a slot 36 therebetween, as will be clear from Fig. 3. Arranged between the frame elements 34 and parallel to the tubular elements 30 are thin bands 38, which in dependence on their angular position provide an intermittent screening of the driver's field of vision of the roadway like a Venetian shutter. For this purpose the screen requires to be of a size corresponding only to any possible angles of incidence of light rays from approaching head-lights meeting the eye of the driver.

The bands 38, which may occupy the whole or the major portion of the space inside the frame of the screen, are made of metal frosted on the surface thereof or otherwise treated so that light falling on said surface will be absorbed. The bands 38 are preferably made of a section having a central portion (Fig. 6) merging into thinner edge portions 40, which latter are dispensed with, however, for a distance adjacent the two ends of the band (Fig. 5). The bands which should be as light as possible may have a maximum thickness of a few tenths of a millimetre and a width of 1 to 4 millimetres. Their end portions containing apertures 42 are inserted through the slots 36 of the bars 34, and are retained with the desired separation by means of distance pieces 44 (Figs. 3 and 4). These distance pieces, which are superimposed within the bars 34, have a thickness corresponding to the desired pitch of the bands, such thickness being of the order of 0.5 to 2 millimetres, for example. The distance pieces 44 have projecting studs 46 at their middle portion fitting into the apertures 42 in the band ends.

To facilitate centering of the bands 38, the central portion of the distance pieces 44 is offset, so that each band lies in a plane extending approximately through the centre of gravity of the side portions of the associated distance pieces as shown in Fig. 4. Here, the stud 46 in one distance piece enters a recess 48 in the ridge formed by the offset in the adjacent distance piece. To eliminate the influence of unavoidable variations in the dimensions of the bands 38 and the distance pieces 44, rubber fillets 50 are inserted between the distance pieces and the inner shanks of the bars 34.

The bands 38 are maintained under tension by means of nuts 52 threaded on the ends of pins 54 arranged on the tubular elements 30, 32 and adapted to be tightened up against the bars 34. The initial stress thus imparted to every band may amount to 0.5 kilograms, for example. The frame is braced against warping by means of forked struts 56 having a sleeve-shaped portion 58 held on the frame member 30 by means of bolts 60, the forks being adapted to engage the frame members 34.

Arranged between the edges of the bands 38 are members intended to effect their angular movement. These members comprise ribs 62 formed of a light material, such as light metal or plastic, a pair of said ribs being connected at their upper ends to arms 64 by pins 66 (Fig. 9) and bearings in the form of rubber sleeves 68, which latter permit angular movement between the arms and the ribs. The arms 64 are secured to a shaft 70, which is rotatably mounted in supporting members 72 secured to the upper tubular element 30 by means of bolts 71. Inserted between these supporting members and the shaft 70 are rubber sleeves 74, which also act as thrust bearings to ensure the axial position of the ribs 62.

Similarly, each pair of ribs is rotatably connected at their lower ends to arms 76 through pins 78 (Fig. 10) and rubber sleeves 80. In this case the arms 76 are rotatably mounted on a spindle 82 through the intermediary of rubber sleeves 84. Each spindle 82 is secured to the lower tubular element 32 by means of supporting members 86.

Secured by means of adhesive or otherwise to the edges of the pair of ribs 62 facing one another are fillets 88 (Fig. 8) of rubber, said fillets having a dented inner profile so as to form grooves or the like 89 engaged by the edges of the bands. The indentation is so formed that the planes of the bands 38 will at least approximately coincide with the lines of vision of the driver through the screen 18, as indicated by the dot-dash lines in Fig. 1. The screen is adjustable about a pivot 103 to allow its adjustment to varying eye level of the driver. Further, the screen may be swung rearwardly and upwardly around said pivot so as to be moved out of its operative position.

Thus, if the shaft 70 is turned in a clockwise direction as viewed in Fig. 7, the upper arms 64 will be entrained in this movement so as to carry along the ribs 62, the right-hand rib of each pair of ribs being thus displaced downwardly, while the left-hand rib is displaced upwardly. Consequently, the bands 38 located between the rubber fillets 88 will also be turned through an angle of such magnitude that the bands, when viewed from the eye of the driver, will overlap so as to shut off the view of the driver. The turning movement of the bands, which takes place about the centre line, is facilitated by reason of the width of the bands, which is reduced near the ends, as stated hereinbefore. The angle of turning will be smaller in a direction toward the secured band ends, which is of no importance, however, since these band ends are located outside the actual angle of vision of the driver. Due to the fact that the movable parts of the screen can be made light, and to the feature that the movements between the various elements thereof are transmitted through rubber bearings, the mass is very small and the sliding friction practically nil.

Secured to the shaft 70 is a lever 90 connected by a link 92, between which and the lever is arranged a rubber bearing 93, to a movable actuating coil 94 of an electrodynamic driving device having a fixed magnet 96. The casing 98 of said device is secured to the frame member 30 by means of clamping members 100 and said device is of the type used in connection with electrodynamic loudspeakers and consequently need not be described in detail herein. The actuating coil 94 is centered by a pleated diaphragm 102.

Figure 13:
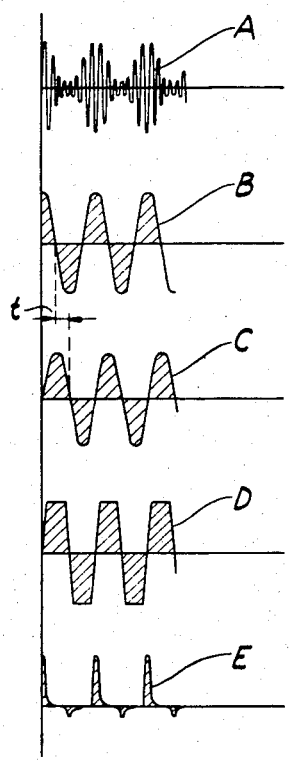
Fig. 13 shows a diagram of the voltage curves obtained at various points of the embodiment according to Fig. 12 as a function of the time.
Figure 14:
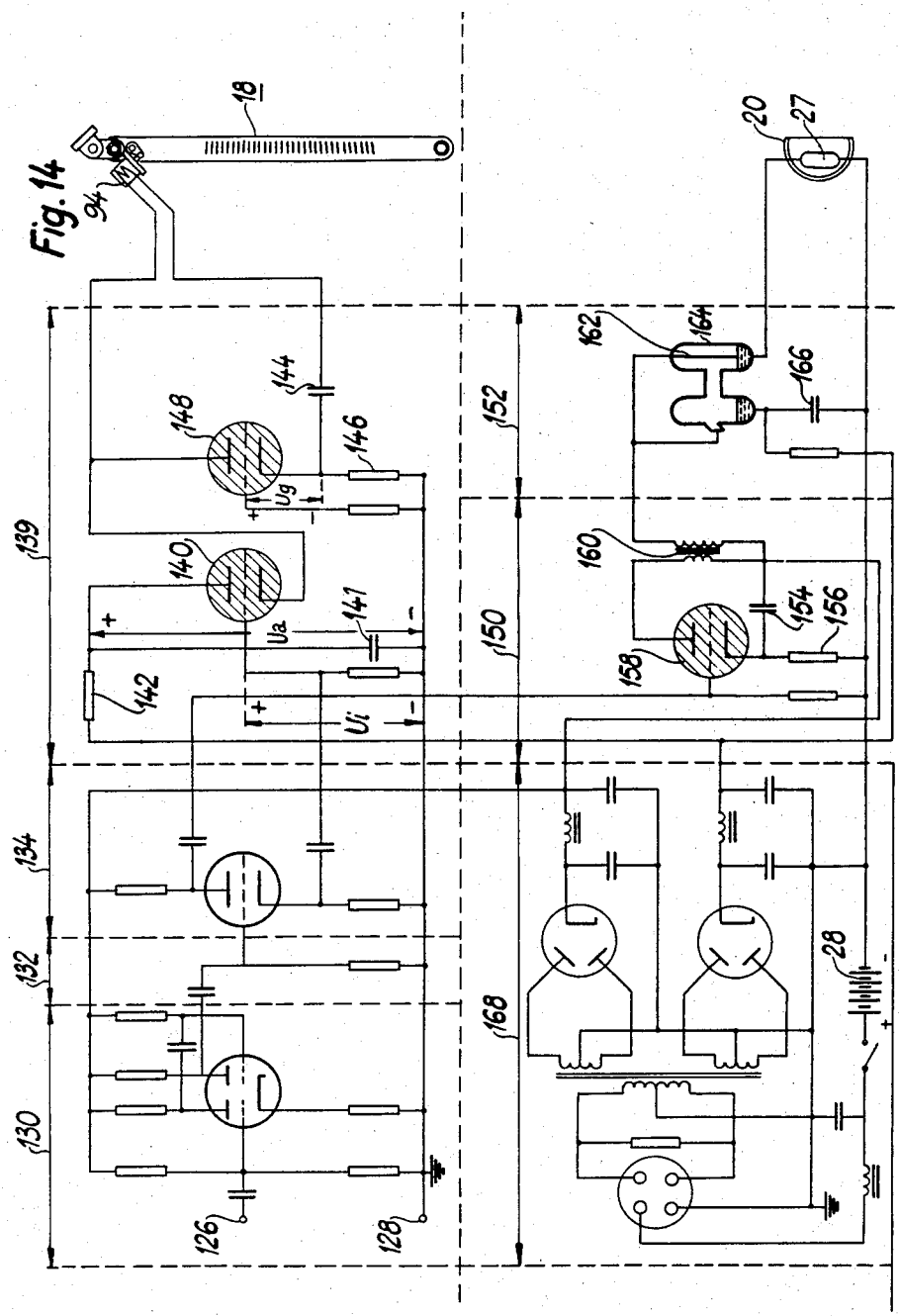
Fig. 14 shows a diagram of connections for another part of the electrical apparatus adapted to feed the headlights and the screen synchronously with synchronization pulses emanating from the part of the apparatus shown in Fig. 12.
Figure 15:
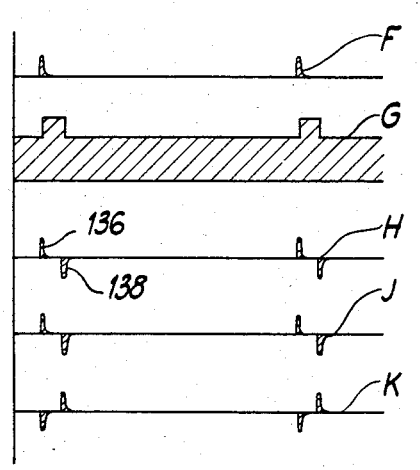
Figs. 15 to 17 are diagrams of the voltage curves obtained as a function of the time at various points of that part of the apparatus shown in Fig. 14.

Figs. 12 to 17 illustrate, with the aid of wiring diagrams, one embodiment of the unit 26 for operating the actuating coil 94 and thus the bands 38 at a frequency determined by radio signals transmitted from one or more stations. These radio signals may have a constant frequency, although this is not essential since they will be intercepted by the approaching cars at the same time. In Figs. 12 and 14, the individual elements have been denoted by symbols according to common practice.

An antenna 110 arranged on the vehicle will intercept radio signals of the form shown in the first diagram A of Fig. 13, wherein (as in Figs. 15 to 17) the ordinate represents the voltage and the abscissa the time factor. The radio signals are amplified in a radio frequency amplifier comprising the section 112 of the wiring diagram shown in Fig. 12 and which like the other elements of the unit, which are of known kind, will not be described herein in detail. The signals are demodulated in a demodulator 114, which creates an audiofrequency voltage at 115 according to the diagram B of Fig. 13. This voltage is supplied to a goniometer 116, which is controlled by a compass 118 and from the rotor of which a voltage of the same form and frequency as that of the supplied voltage is obtained (at 119), but the phase of which is displaced relative to the latter at an angle corresponding to the time $t$ in accordance with the disclosure in diagram C of Fig. 13. This angle depends on the orientation of the rotor in the goniometer, which is in turn determined by the direction of the compass needle 118 relative to the vehicle. The sinusoidal voltage shown in the diagram C is amplified in an audiofrequency amplifier 120 and is converted in a cutting stage 122 into a square-topped wave form in the conductor 123 as shown in the diagram D of Fig. 13. By differentiation in a differentiating circuit 124, the square-peaked voltage is distorted into positive voltage peaks according to the diagram E of Fig. 13, which are transmitted to the part of the apparatus represented by the wiring diagram shown in Fig. 14.

The radio signals originally entering the unit 26 (Fig. 1) have thus been converted into impulses according to the diagram E, the frequency of which is the same as that of the signals while being displaced in phase in dependence on the driving direction of the vehicle relative to the compass needle 118. If two motor cars approaching one another are assumed to be on a straight stretch of road, their driving directions are substantially parallel but oppositely directed, and consequently the phase displacement between them will be substantially 180°.

The synchronising pulses emanating from the part of the apparatus shown in Fig. 12 are now supplied to the input terminals 126, 128 of a multivibrator 130 which by a differentiating circuit 132 and pulse reverser 134 emits two differently timed positive voltage pulses intended to release one operating cycle of the actuating coil 94 for the screen 18 and another operating cycle of the gas discharge tube 27 of the head-light 20. The incoming positive voltage pulses according to the diagram F in Fig. 15 will be supplied from said part of the apparatus to one of the grids of the multi-vibrator 130, which is of the so-called oneshot-type, and which for every pulse gives a square voltage pulse according to the diagram G of a length determined by the multi-vibrator.

The voltage obtained according to the diagram G is converted in the differentiating circuit 132 into a positive and a negative pulse of short duration shown in the diagram H (Fig. 15) corresponding to the front edge and the rear edge of the square pulse, respectively. The leading positive pulse 136 is supplied to the driving stages of the screen 18, whereas the negative pulse 138 upon reversal actuates the driving stages of the gas discharge tube (compare the diagrams J and K). The intervals between which the screen and the discharge tube will operate, are thus determined by the intervals between the voltage pulses emanating from the part of the apparatus shown in Fig. 12.

The driving stages 139 of the screen 18 are intended upon reception of a positive voltage impulse on the grid of one tube or thyratron 140, to feed the actuating coil 94 in the driving device of the screen with an alternating current having a great amplitude.

Figure 16:
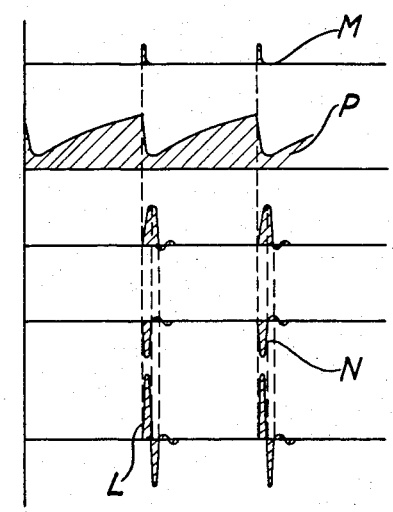

A condenser 141 is then charged through a resistance 142 to a high positive voltage $U_a$ (illustrated by the diagram P in Fig. 16). This voltage constitutes the anode voltage of the thyratron 140, which is caused to become operative by the positive voltage pulse $U_1$ according to the diagram K (Fig. 15) on the grid thereof. This voltage pulse corresponds to the voltage pulse 136 in the preceding figure. When the thyratron is conducting, the condenser 141 discharges through the actuating coil 94 and a condenser 144, which is charged. When the condenser 144 has become sufficiently charged, the thyratron 140 will suddenly interrupt the current path to the actuating coil, a cathode resistance 146 and the condenser 144, which has now received a considerable portion of the charge previously taken up by the condenser 141. The voltage which at the same time prevails across the condenser 144 constitutes the anode voltage of the second tube or thyratron 148, which suddenly commences to conduct and to open a current path, through which the condenser 144 is discharged. The resulting discharge current flows through the actuating coil 94 but in a direction opposed to that of the charging current as stated above.

The thyratron 148 is prevented from becoming operative during the time the condenser 144 is being charged, by the fact that the voltage $U_g$ (according to the diagram N in Fig. 16) resulting from the charging current through the cathode resistance 146 makes the cathode positive relative to the grid so as to increase the requisite operating voltage of the thyratron to a value such that the thyratron cannot become operative before the charging current has become sufficiently small.

The driving means of the gas discharge tube 27 is constituted by a saw tooth generator 150 and a pulse generator 152. This arrangement is intended upon the reception of an impulse in the form of a positive voltage (according to diagram K of Fig. 15 and T of Fig. 17) on the grid of the saw tooth generator, to feed the gas discharge tube with a short current pulse of a high amplitude.

Figure 17:
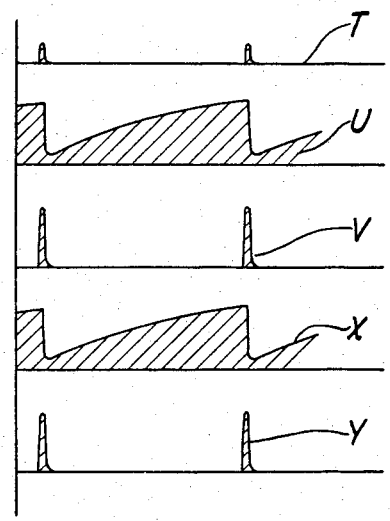

A condenser 154 is charged through a resistor 156 up to a positive voltage as shown in the diagram U of Fig. 17. The voltage across the condenser constitutes the anode voltage of a thyratron 158, which is caused to become operative through the aforementioned positive voltage pulse on the grid thereof. The condenser is then suddenly discharged through the primary winding of a transformer 160. A high voltage (diagram V in Fig. 17) is induced in the secondary winding of this transformer, said voltage being supplied to an ignition electrode 162 in the mercury relay 164 of the pulse generator 152. The condenser 166 comprised in the generator 152, which has been previously charged by a high positive voltage (according to diagram X, Fig. 17) is discharged through the mercury relay, when the latter is suddenly made operative by the positive voltage peak from the saw tooth generator. The discharge current (shown in diagram Y, Fig. 17) from the condenser 166 flows through the gas discharge tube 27, which consequently emits a light impulse of short duration. When the condenser 166 has become discharged, the mercury relay as well as the discharge tube are extinguished, and the condenser commences to become charged again.

The section 168 of the apparatus shown in Fig. 14 is intended to convert a low voltage D. C. taken off the battery 28 into a high voltage D. C. in two circuits, preferably of mutually different voltages. These circuits supply the current to the various sections of the apparatus.

As will be understood from the above, the screen 18 is actuated to open the field of vision somewhat before the head-light 20 is lighted. This will ensure that the bands 38 have had time to perform a rotary movement, preferably to an approximately fully open position, or slightly less at the moment when light is emitted from the head-light. The bands may then turn further through a small angle, before returning toward their closed position. The impulses from the unit 26 are so selected that the current supply to the head-light ceases so that the latter is extinguished before the bands of the screen commence to obstruct the driver's view to any great extent.

The frequency at which the screen 18 and the head-light 20 are actuated, in the present case the frequency of the radio signals, according to the invention is high, such as between 20 and 50 per second or higher, and preferably above 35. The ratio between the dark and the light portions of every cycle should, with respect to the head-light, be greater than 9:1 to ensure a favorable result, and may amount to 20:1 up to 50:1 or an even higher ratio. To obtain the co-operation mentioned in the preceding paragraph between the movement of the screen bands and the light emission of the head-light during a cycle, the former will take more time than the latter. The intensity of the light emitted by the gas discharge tube 27 of the head-light is greater than in ordinary head-lights. Here, the luminous intensity may be selected in known manner so that it will increase approximately in inverse proportion to the so-called intermittence quotient, that is to say the ratio between the duration of the light flash and the total time of a cycle. In such case the consumption of energy will be of the same order of magnitude as for an ordinary head-light.

In the embodiment according to Figs. 12 to 17, light flashes are emitted by the head-light 20 while the screen 18 is open, and further the screen is kept closed for a considerable portion of the time between the light flashes. By controlling the process by means of radio signals and a compass, the result is that light flashes from approaching vehicles carrying similar arrangements will occur only during those periods when the screen of one's own vehicle is closed.

Figs. 18 to 22 show an embodiment of the invention adapted without the aid of radio signals to determine the frequency as a function of the direction of driving of the vehicle relative to the terrestrial magnetism, and which is therefore intended to replace the section of the apparatus shown in Fig. 12 in combination with the section of the apparatus shown in Fig. 14.

An oscillator 170 generates a sinusoidal voltage at the point 171 according to the diagram $A_1$ of Fig. 19 at a constant frequency. This voltage is supplied to a goniometer 172 as well as to one of the control grids of a phase detector 174. The voltage induced at the point 176 in the rotor of the goniometer (shown in diagram B₁, Fig. 19), which is displaced in phase by a definite angle rleative to the voltage supplied to the goniometer, is fed to the other control grid of the phase detector 174. The current through this phase detector is dependent on the phase difference between the voltages applied to said two control grids, said difference being determined in turn by the rotor of the goniometer 172 controlled by means of a compass 178.

The voltage impulses transmitted by the phase detector at the point 180 (shown in diagram C, Fig. 19) have a duration dependent on the direction of motion of the vehicle relative to the terrestrial magnetism. These impulses are converted in a rectifier 182 into a flat D. C. voltage shown in the diagram D₁ of Fig. 19. The D. C. voltage is supplied through a current reverser 184, mounted on a shaft between the compass needle 178 and the rotor of the goniometer 172, and through a D. C. voltage amplifier 186, to the grid of a thyratron 190 in a saw tooth generator 188. The latter operates in known manner and yields positive voltage peaks according to the diagram F₁ of Fig. 19, at a frequency determined by the grid potential of the thyratron 190. The diagram E₁ of Fig. 19 shows how the anode voltage of said thyratron varies with the time during two operating cycles.

Thus, if the direction of driving of the vehicle relative to the terrestrial magnetism is altered, the voltage given by the rectifier 182 will vary according to the diagrams G₁ in Fig. 21, where the ordinate represents the voltage and the abscissa the angle ($\phi$ in Fig. 20) between the magnetic north direction 185 and the driving direction. This voltage, however, is the same for two different driving directions, but is determined by the driving direction in one sense only by means of the current reverser 184 and the D. C. voltage amplifier 186. The current reverser is so devised that the voltage according to the diagram G₁ in Fig. 21 will be supplied to the grid of the D. C. voltage amplifier with directions of driving between 0° and 180°, whereas said voltage will be supplied to the cathode of said amplifier with driving directions between 180° and 360°. If this change from grid to cathode takes place at intervals, the voltage produced by the D. C. voltage amplifier will vary with the driving direction according to the diagram H₁ of Fig. 21. This voltage, which is supplied to the grid of the thyratron 190 as stated above, determines the frequency at which the saw tooth generator 188 transmits voltage peaks of the form shown in diagram F₁ of Fig. 19.

The voltage peaks are supplied to the input terminals 126, 128 in Fig. 14 and thus determine the frequency of the arrangement, which will vary according to the diagram shown in Fig. 22, where the ordinate represents the frequency and the abscissa stands for the driving direction.

In the embodiment shown in Fig. 18, the frequency of the emitted light flashes is dependent on the driving direction in a manner such that it will decrease continuously from a maximum value in a determined driving direction, for example when the vehicle is driven in a circle, to a minimum value immediately before the starting direction is reached. It is, therefore, of particular importance that the light flashes are short relative to the dark intrevals, and that the frequency is high. Moreover, it will be found advisable to have the ratio between the frequencies emitted by two vehicles approaching one another approximately equal to the ratio between the time during which the screen is closed and the time of a complete cycle. If the latter ratio is 0.9, for example, and the frequency of the arrangement of a vehicle A is 10% higher than that of the arrangement of another vehicle B, the operation will be as follows.

During approximately nine cycles, the driver of the car A is protected against glare from the car B. During the tenth cycle both cars will have full illumination on at the same time, the light beams from the two cars being directed toward each other. During the following nine cycles, the driver of the car A will again be protected against glare. Conditions will be analogous for the driver of the car B. It is thus found that, at 10% of difference in frequency and illumination for a tenth of the total time, each driver will have his own illumination perfect and glare from the approaching car, which is only one tenth of the value that would have prevailed if both drivers were driving their cars with a fixed light of the corresponding average luminous intensity and without any screening means.

In Fig. 22, the frequency at the points 192 should consequently be approximately 20% higher than the frequency at the points 194, if the ratio between the time of a flash and of a whole cycle is to be equal to one tenth. As will be clear from the curve shown in the figure, the difference in frequency of two approaching motor cars, having their driving directions relatively displaced by 180°, will then always amount to 10%. It is important, as will be seen from Fig. 22, that upon a turning movement through one revolution about a vertical axis, the frequency will pass suddenly from the low to the high value, in order to avoid transition zones where uncertainty prevails as to whether the approaching vehicles have the intended difference with respect to the frequency adjustment.

Preferably, the frequency is so high that the light flashes from the approaching car never will occur less frequently than twenty times per second. In the example given above the frequency will thus be two hundred per second. It is preferably of the order of 100 to 250 per second. This will ensure in the present embodiment that not only the light from the roadway but also the light from the head-light of the approaching car will effect the retina of the eye so frequently that it will continue substantially during the dark periods.

While several more or less specific embodiments of the invention have been shown, it is to be understood that this is for purpose of illustration only, and the invention is not to be limited thereby, but its scope is to be determined by the appended claims. In the foregoing description where dark periods have been mentioned, such periods are to be generally understood as those when the head-light does not cause glare, so that a less intense light during these periods is emitted. If the majority of vehicles on the roads are equipped with an installation as that hereinbefore described, wherein all head-lights are synchronised, for instance by radio transmitters, the screens may be so devised that the time when they are open will be of longer duration than as stated above and even longer than the time occupied by half a cycle. Where the frequency is varied as distinct from phase displacement, as is the case for example in the second embodiment described above, it may be controlled by a generator rotating with a controlled number of R. P. M. instead of by an oscillator. The frequency may be adjusted to two or more ranges by adjusting the number of revolutions per minute.

What I claim is:

1. In a vehicle a system for illuminating the road and for counteracting glare from approaching headlights, said system including a light source on said vehicle for illuminating the road, electrical circuit means for intermittently energizing and de-energizing said light source to provide intermittent illumination, means on said vehicle for intermittently screening the field of view of the driver of said vehicle, means for operating said screening means in phase with the operation of said light source, a substantially fixed frequency signal source and automatic means including circuit means connected to the output of said signal source and operable in response to changes in the direction of movement of said vehicle to automatically vary the frequency of the output of said last named circuit means to provide a control signal, the output of said automatic means being connected to the means for energizing and de-energizing said light source and to the means for operating said screening means to energize and de-energize said light source and operate said screening means at a frequency determined by the direction of movement of said vehicle and with the operating phase relationship of said light source and said screening means remaining substantially constant whereby with said system installed in two vehicles approaching each other, the frequency of operation of said intermittent light source and said screening means will differ in accordance with the relative directions of movement of said two vehicles to counteract glare from the headlights of each vehicle.

2. A system as defined in claim 1 in which said automatic means includes means automatically operable during turning movement of said vehicle through substantially 360 degrees in one direction to continuously decrease the frequency of said signal from a maximum to a minimum value and upon completion of said turning movement to substantially instantaneously raise said frequency from said minimum value to said maximum value.

3. A system as defined in claim 1 in which said automatic means includes a magnetic compass.

References Cited in the file of this patent

UNITED STATES PATENTS

| | | |
|---|---|---|
| 1,786,518 | Chambers | Dec. 30, 1930 |
| 2,003,248 | Chilowsky | May 28, 1935 |
| 2,066,680 | Gieskieng et al. | Jan. 5, 1937 |
| 2,131,888 | Harris | Oct. 4, 1938 |
| 2,187,648 | Franklin | Jan. 16, 1940 |
| 2,574,729 | Coffman | Nov. 13, 1951 |

FOREIGN PATENTS

| | | |
|---|---|---|
| 525,493 | Great Britain | Sept. 2, 1940 |